United States Patent
Xiao et al.

(10) Patent No.: US 11,379,320 B2
(45) Date of Patent: Jul. 5, 2022

(54) CONTAINER RECOVERY

(71) Applicant: International Business Machines Corporation, Armonk, NY (US)

(72) Inventors: Ping Xiao, Zhangping (CN); Xin Zhou, Beijing (CN); Cheng Cheng Dong, Beijing (CN); Yu Long Tong, Ningbo (CN); Zhen Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 173 days.

(21) Appl. No.: 16/923,233

(22) Filed: Jul. 8, 2020

(65) Prior Publication Data

US 2022/0012137 A1    Jan. 13, 2022

(51) Int. Cl.
G06F 11/00 (2006.01)
G06F 11/14 (2006.01)
G06F 9/445 (2018.01)

(52) U.S. Cl.
CPC ...... G06F 11/1469 (2013.01); G06F 9/44505 (2013.01); G06F 2201/84 (2013.01)

(58) Field of Classification Search
CPC ............. G06F 11/1469; G06F 11/1438; G06F 9/44505; G06F 2201/84
See application file for complete search history.

(56) References Cited

U.S. PATENT DOCUMENTS

| | | | |
|---|---|---|---|
| 2016/0034359 A1 | 2/2016 | Cabrera | |
| 2018/0173502 A1 | 6/2018 | Biskup | |
| 2019/0014023 A1 | 1/2019 | Gupta | |
| 2019/0132203 A1 | 5/2019 | Wince | |
| 2020/0117478 A1* | 4/2020 | Li | G06F 11/1461 |
| 2022/0012137 A1* | 1/2022 | Xiao | G06F 9/44505 |

FOREIGN PATENT DOCUMENTS

| | | |
|---|---|---|
| CN | 105357296 B | 10/2018 |
| CN | 109697078 A | 4/2019 |

* cited by examiner

*Primary Examiner* — Philip Guyton
(74) *Attorney, Agent, or Firm* — Stephen R. Yoder; Aaron N. Pontikos

(57) ABSTRACT

A processor initiates a run of a target container in a distributed computing environment. A processor detects at least one error occurring during the initiation of the target container. A processor determines at least one fix image based on the at least one error. A processor performs an error recovery of the target container based on the at least one fix image. A processor runs, in response to successfully performing the error recovery of the target container, the target container in the distributed computing environment.

17 Claims, 7 Drawing Sheets

CONTAINER RECOVERY

BACKGROUND OF THE INVENTION

The present invention relates generally to the field of container management, and more particularly to container error recovery.

Containers provide a logical package in which applications are stored in a manner that supports execution of the application in a variety of environments instead of single target computing environment, as most applications are compiled to run in a single operating system or environment. As such, container-based applications are easily and consistently deployed, regardless of the target environment. Containers provide benefits to distributed computing environments, as developers focus on application logic and dependencies to create and support container standards, while operators of distributed computing environments can focus on deployment and management without bothering with application details such as specific software versions and configurations specific to the app.

SUMMARY

Embodiments of the present invention provide a method, system, and program product to recover a container during an error. A processor initiates a run of a target container in a distributed computing environment. A processor detects at least one error occurring during the initiation of the target container. A processor determines at least one fix image based on the at least one error. A processor performs an error recovery of the target container based on the at least one fix image. A processor runs, in response to successfully performing the error recovery of the target container, the target container in the distributed computing environment.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
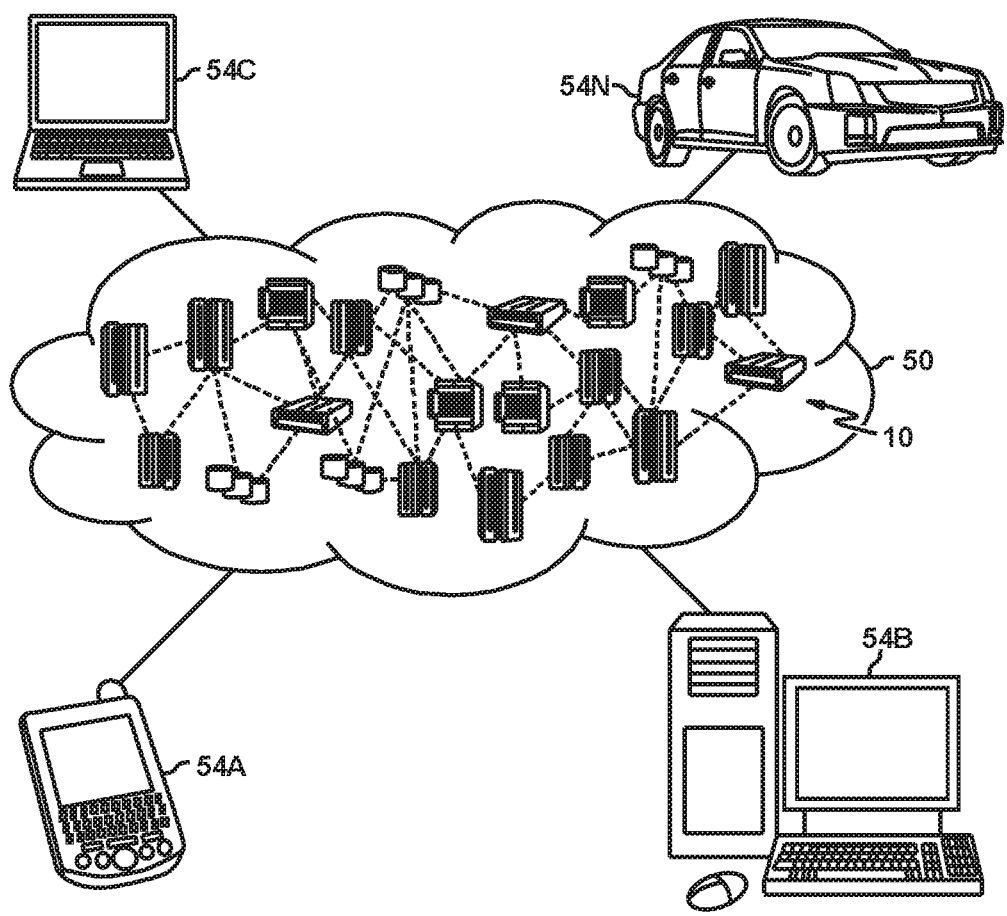
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
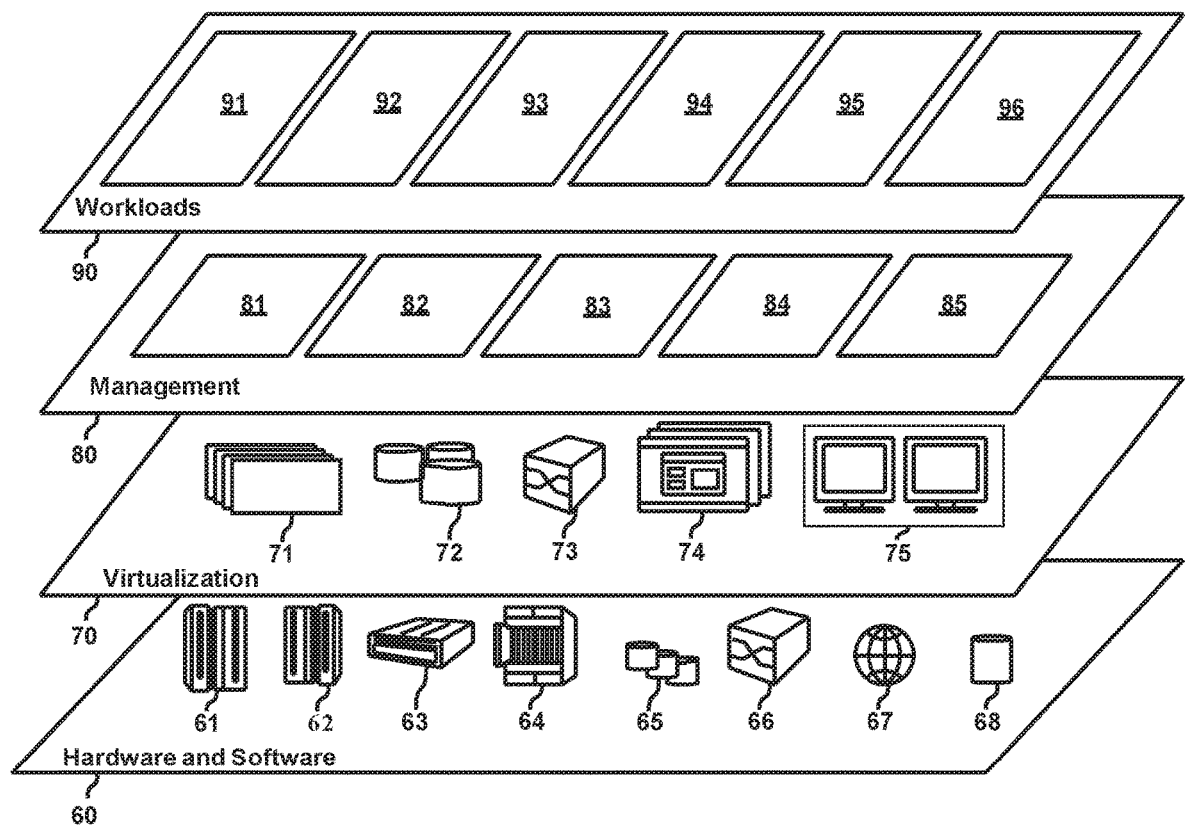
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components includes: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container manager 96.

Container manager 96 provides various features for deploying and running containers in cloud computing environment 50. Additionally, container manager 96 are provides various features to workload layer 90 that provide automatic correction and recovery of containers that produce an error during initialization in a distributed computing environment, such as cloud computing environment 50. A container, sometimes referred to as image, is a lightweight, standalone, executable package of software that includes everything needed to run an application (e.g., code, runtime, system tools, system libraries and settings) in a distributed computing environment, such as cloud computing environment 50. A container uses an image to construct a run-time environment and run an application. As discussed herein, many enterprises provide support for container orchestration that manage workloads in cloud computing environment 50. However, prior solutions fail to provide an efficient maintenance mechanism for unexpected failures of the containers. For example, if a container encounters an unrecoverable error, the tools will try to restart the container in different ways at different intervals, however simply restarting the container usually cannot solve the problem. In this case, users or administrators of the container have to manually recover the container from the error using an error log for the container.

Embodiments of the present invention provide an improved solution for container recovery. According to embodiments of the present invention, in some scenarios during initiation of a container, an error is detected during initiation of a target container. In such scenarios, embodiments of the present invention identify a fix image associated with the error. The fix image comprises information for updating at least a part of the target container to eliminate the detected error. In accordance with the error recovery mechanism as proposed herein, fix images specifically designed for dealing with respective errors are used to enable the automatic and intelligent recovery of the containers. As a result, time-consuming and error-prone human operations can be reduced during the container management, thereby improving the efficiency of the container management.

Figure 3:
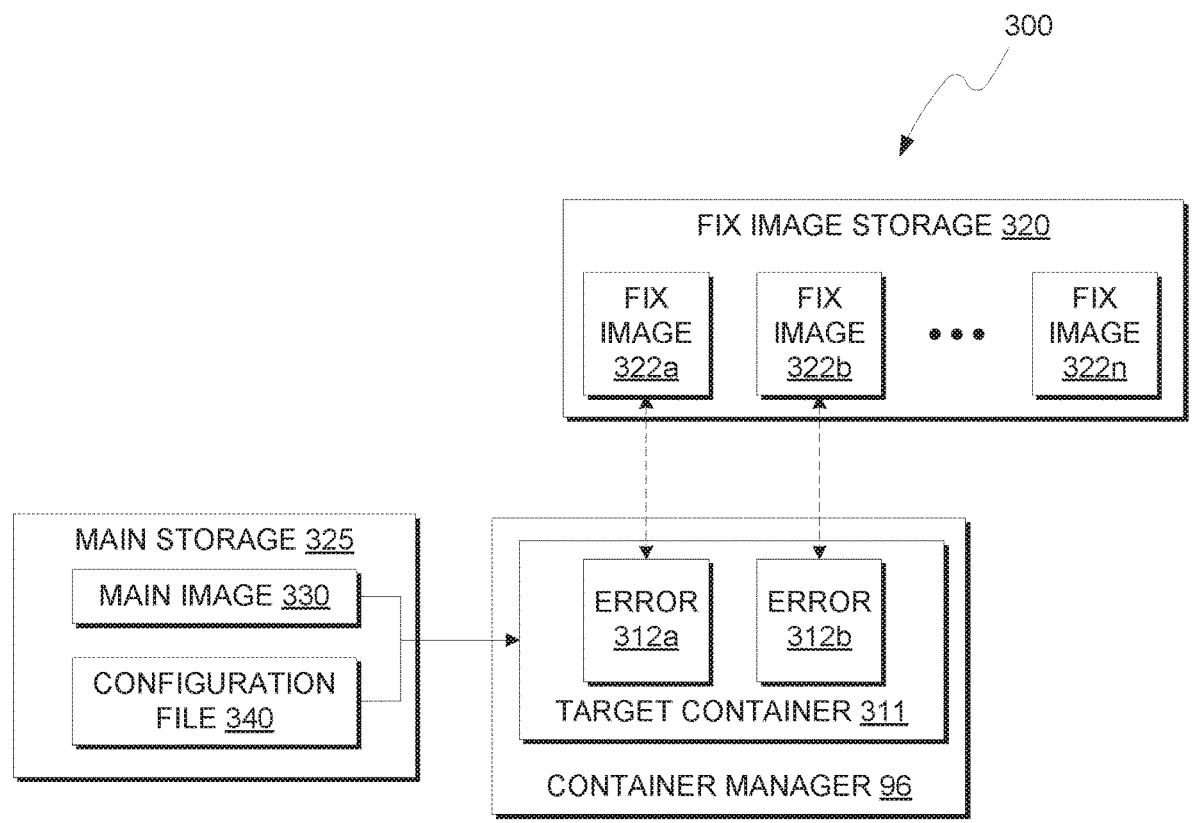
FIG. 3 depicts a schematic diagram of an example of a container management environment in which an embodiment of the present invention can be implemented.

FIG. 3 shows a schematic diagram of an example of a container management environment 300 in which an embodiment of the present invention can be implemented.

The container management environment 300 includes a container manager 96 in which at least one target container 311 is constructed by the container manager 96. In some embodiments, the target container 311 is constructed by using a main image 330 and configuration file 340 stored in a main storage 325. The configuration file 340 configures an environment of the target container 311. The main image 330 comprises code to be executed in the target container 311. As mentioned above, a container is a standard unit for packaging up codes and their dependencies, so the code can run quickly and reliably on a variety of devices (e.g., as depicted by hardware and software layer 60) and in a variety of environments (e.g., as depicted by virtualization layer 70). A container isolates code from devices and environments within cloud computing environment 50 to ensure that the code works uniformly despite differences between environments and devices. A container image (referred to herein as an image) is a standalone and executable package of codes that includes information needed to run the codes, such as runtime files, system tools, system libraries and settings, or the like. The container is initiated with the container image.

In various embodiments, the container management environment 300 also includes a fix image storage 320 in which a set of predetermined fix images are stored. For example, the set of predetermined fix images also includes fix images 322*a-n* (collectively referred to as "fix image 322"). A fix image 322 is a container image which comprises information for updating a container to remove an error occurring during initiation of the container. One of ordinary skill in the art will understand that the number of fix images are intended to be illustrative only and embodiments of the invention are not limited thereto. In addition, although the main storage 325 and the fix image storage 320 are illustrated as separate components, the main storage 325 and the fix image storage 320 may be the same component.

Container manager 96 initiates, starts, or otherwise intercuts to begin processing the target container 311. One of ordinary skill in the art will understand that the target container 311 can also be initiated by any other device with computing and/or storage capability and embodiments of the invention are not limited thereto. In some cases, errors, such as errors 312*a* and 312*b* (collectively referred to as "error 312") may occur during the initiation of the target container 311. It is understood that the number of errors is intended to be illustrative only and embodiments of the invention are not limited thereto.

Figure 5:
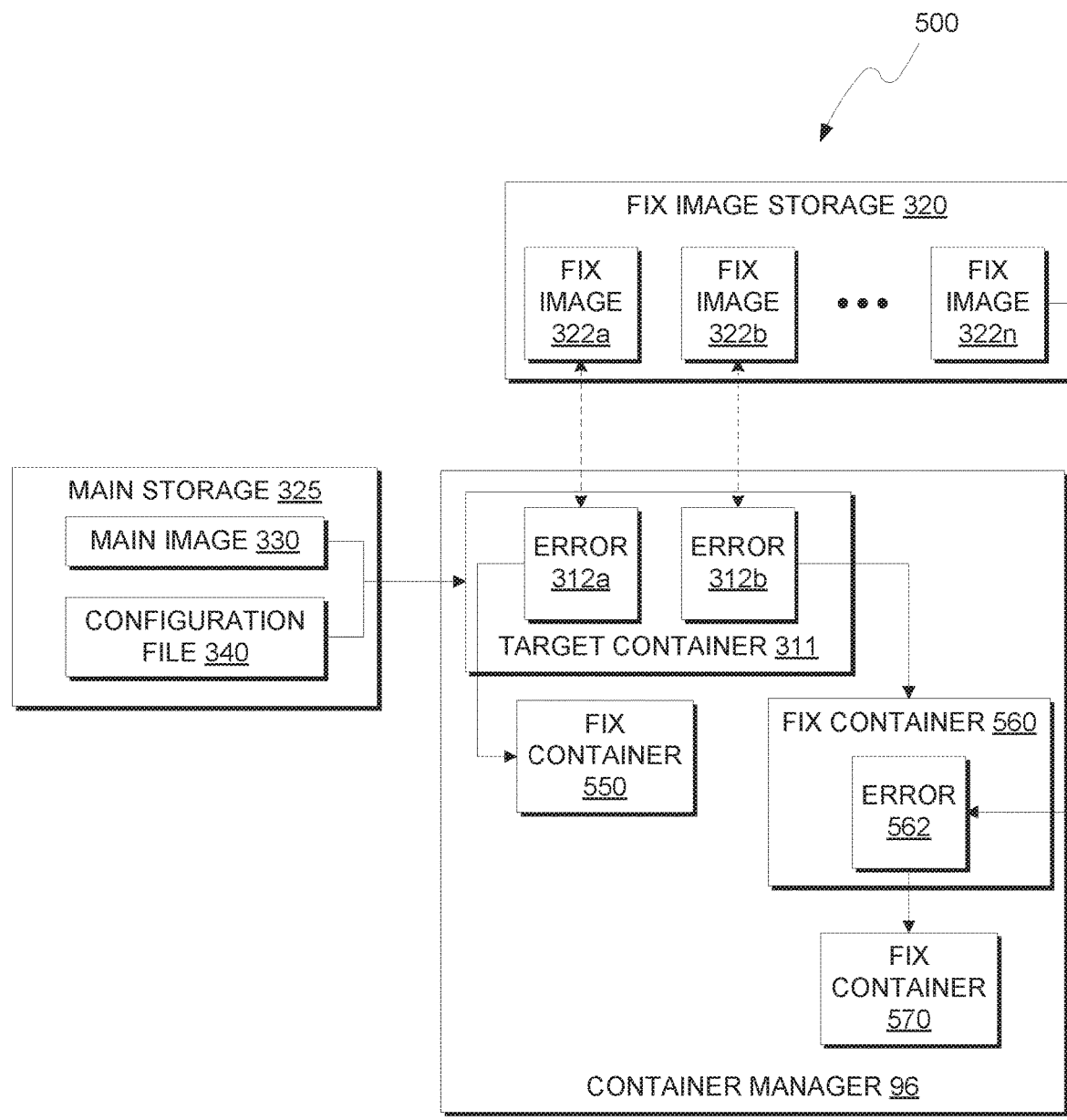
FIG. 5 depicts a schematic diagram of an example of a container management environment in which an embodiment of the present invention can be implemented.

Container manager 96 detects then errors 312 occur during initialization. When errors occur, container manager 96 determines corresponding fix images 322 from the set of predetermined fix images stored in the fix image storage 320 and recovers the target container 311 from errors 312 with these fix images 322. For example, the container manager 96 determines the fix images 322*a-n* associated with the errors 312*a-b*, respectively, so as to perform an error recovery of the target container 311 based on the fix images 322*a-n*. The container recovery performed by the container manager 96 is described with reference to FIGS. 5-7.

Figure 4:
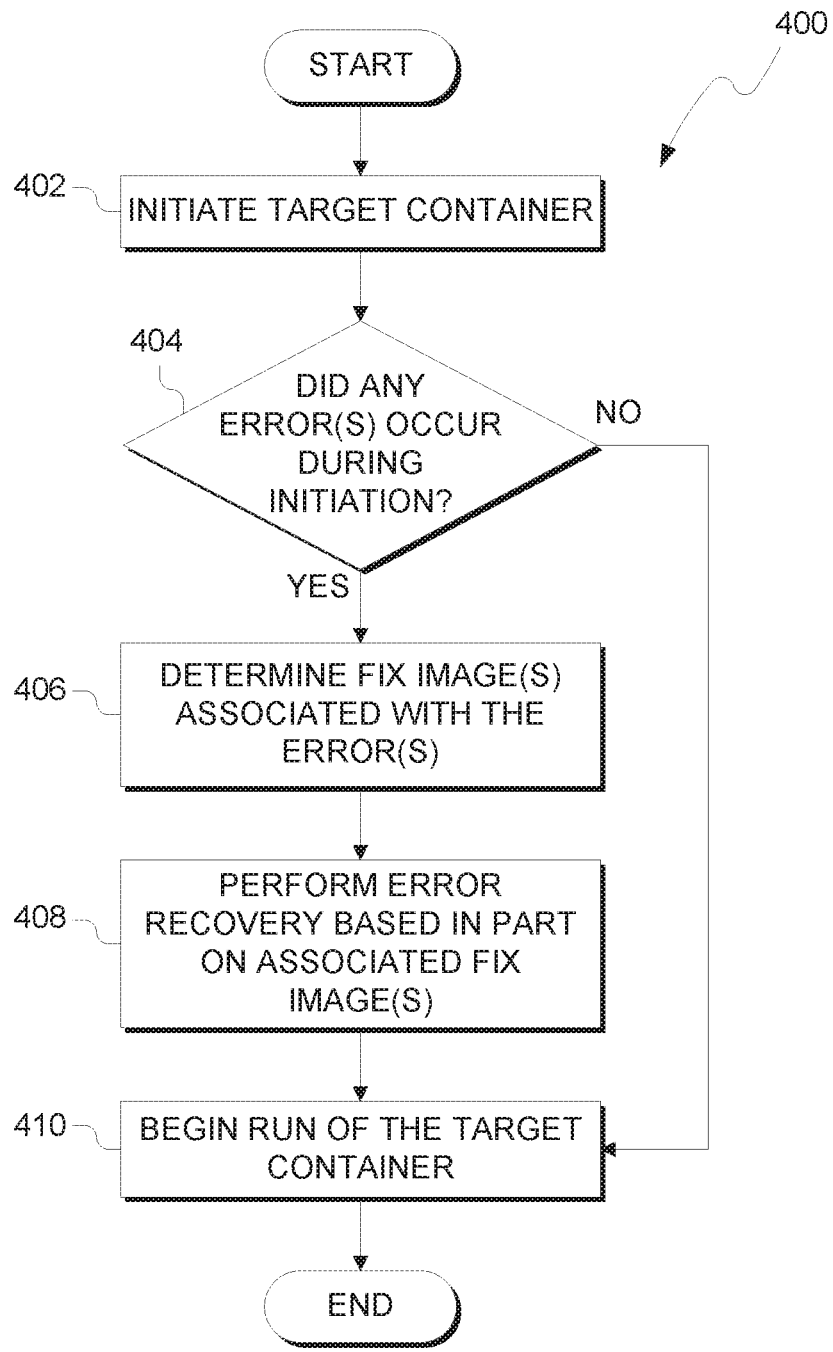
FIG. 4 depicts a flowchart of an example of a method for recovering a container according to an embodiment of the present invention.

FIG. 4 depicts a flowchart of an example of a method 400 for recovering a container according to an embodiment of the present invention. The method 400 may be implemented by the container manager 96, or other suitable computer/computing systems.

At process 402, the container manager 96 detects error 312 occurring, such as the error 312*a* or 312*b*, during initiation of the target container 311. For example, the container manager 96 detects an error event based on an exception or other error message generated during initialization. In some embodiments, the container manager 96 parses a log of messages related to initialization of target container 311 for information about the error 312.

As discussed above, the container manager 96 initiates the run of target container 311. In some embodiments, target container 311 is initiated with the configuration file 340 and the main image 330.

In some cases, the configuration file 340 and/or the main image 330 may be defective, and thus causing the error 312 during the initiation of the target container 311. For example, a missing prerequisite image is required for initiating the target container 311. However, the configure file 340 lacks configuration information for the prerequisite image. Thus, a configuration error 312 caused by the configuration file 340 occurs during the initiation. In addition, if the code in the main image 330 declares a string of characters for a Boolean type variable, the container manager 96 can receive a "mismatch type" syntax error 312 caused by the main image 330 during the initiation.

In some embodiments, the container manager 96 monitors a status of the target container 311 during the initiation of the target container 311. In this case, when the error 312 occurs, the error 312 can be detected by the container manager 96. For example, an error event including specific information about the error 312 from the target container 311 can be detected by the container manager 96.

After detecting the error 312, YES branch of process 404, the container manager 96 determines a fix image 322 associated with the error 312, for example, the fix image 322*a* associated with the error 312*a* or the fix image 322*b* associated with the error 312*b* (process 406). In some embodiments, an association can be established between respective fix images 322 in the set of predetermined fix images and corresponding errors 312. If no errors are detected during process 404, NO branch of process 404, then container manager 96 begins running the target container 311 (process 410).

As an example of determining a fix image 322 associated with the error 312, container manager 96 generates an association between the fix image and a syntax error, such as a data type error caused by specifying a string of characters for a Boolean type property. In addition, container manager 96 generates an association between the fix image and a common error, such as a path error caused by incorrectly specifying the path or the specified path being not accessible.

Moreover, container manager 96 generates an association between the fix image and an environment configuration error, such as a prerequisite image missing error, or a storage configuration missing error. For example, the storage configuration missing error may be caused by the storage configuration being deleted, the storage being deleted while the storage configuration exists, or user identification of the storage failing to match the user identification of the storage configuration. Furthermore, container manager 96 generates an association between the customized fix image and a dynamic error. The customized fix image is dynamically generated by the user after the user manually fixes the dynamic error.

In this scenario, the set of predetermined fix images stored in the fix image storage 320 comprise various types of fix images 322 associated with various types of errors, such as a fix image for a syntax error, a fix image for a common error, a fix image for an environment configuration error, a customized fix image for a dynamic error, and the like.

In various embodiments, the association between respective fix images 322 in the set of predetermined fix images and corresponding errors 312 are stored as a table, an XML file, or any other data structure, either in the container manager 96 or in the fix image storage 320, or in any other storage.

In this case, the container manager 96 obtains the association, and selects, based on the association, the fix image 322 associated with the error 312 from the set of predetermined fix images stored in the fix image storage 320. For example, error 312a is a syntax error, and the container manager 96 selects the fix image 322a to correct a syntax error of this type. As another example, error 312b is a configuration error, and the container manager 96 selects the fix image 322b for the environment configuration error. In this way, the container manager 96 can automatically and efficiently determine a fix image targeted to an error.

Further, in some embodiments, before initiating the target container 311, the container manager 96 determines, prior to running target container 311, that error 312 may be caused by the configuration file 340 and/or the main image 330, thereby determining that the fix image 322 that should be used during the initiation, thereby fixing any potential error without the error ever occurring during running of target container 311. For example, the main image 330 contains a Boolean type property and therefore, it is possible to expect that a string of characters might be incorrectly specified for this Boolean type property. In this case, the container manager 96 predicts the syntax error 312a caused by the main image 330 will occur in the target container 311 when executed, and container manager 96 determines to use fix image 322a for the syntax error. In this case, during the initiation of the target container 311, in addition to the configuration file 340 and the main image 330, the container manager 96 initiates the target container 311 with a set of previously selected fix images 322 associated with the predicted errors 312. This set of previously selected fix images 322 is a subset of the whole set of predetermined fix images stored in the fix image storage 320. In this way, the efficiency for determining the fix image 322 is improved and the fix image 322 can be directly applied in the target container 311.

At process 408, the container manager 96 conducts an error recovery for the target container 311 based on the selected fix image 322. At process 410, container manager 96 begins running the target container 311 with the fix images 322 applied in process 408. In some embodiments, the error recovery is performed using fix containers initiated from the fix images. Such process is described with reference to FIG. 5, which shows a schematic diagram of an example of a container management environment 500 in which an embodiment of the present invention can be implemented.

Similar to the container management environment 400 in FIG. 4, the container management environment 500 includes a container manager 96 in which at least one target container 311 is constructed by the container manager 96. In some embodiments, the target container 311 is constructed by using the main image 330 and configuration file 340 stored in the main storage 325. In addition, the container management environment 500 also includes the fix image storage 320 in which the set of predetermined fix images 322 are stored.

In some cases, the errors 312 occur during the initiation of the target container 311 with container manager 96 detecting the error during initialization. In this case, the container manager 96 determines corresponding fix images 322 from the set of predetermined fix images 322 and recovers the target container 311 from these errors 312 with these fix images 322. For example, the container manager 96 determines the fix images 322a-b associated with the errors 312a-b, respectively, so as to perform an error recovery of the target container 311 based on the fix images 322a-b.

Specifically, the container manager 96 initiates a fix container based on the fix image. For example, the container manager 96 initiates fix containers 550 and 560 based on the fix images 322a and 322b, respectively. The fix containers 550 and 560 are child containers of the target container 311 in a container hierarchy. A successfully initiated fix container can update at least a part of the target container 311 to recover the target container 311 from the error. For example, it is assumed that the fix container 550 is successfully initiated and can be used to update and recover the target container 311.

However, in some cases, further errors may occur during the initiation of the fix container. For example, an error 562 occurs during the initiation of the fix container 560. In this case, the container manager 96 determines a further fix image associated with the further error and initiates a further fix container based on the further fix image. For example, the container manager 96 determines a further fix image 322n associated with the further error 562, and initiates a further fix container 570 based on the further fix image 322n. The further fix container 570 is a child container of the fix container 560 in the container hierarchy.

Such process may reiterate until the fix container is successfully initiated or, in some scenarios, a criterion for ceasing the process is met. For example, container manager 96 monitors criterion during recovery based on one or more of the following: a level of the fix container in the container hierarchy, a duration of the error recovery and a number of fix containers initiated for the error recovery.

After the fix containers 550, 560 and 570 have been successfully initiated, the container manager 96 performs the error recovery of the target container 311 with the fix containers 550, 560 and 570. Specifically, the fix container 570 recovers the parent fix container 560, which then enables the recovered fix container 560 to be utilized by fix container 550 to recover the target container 311. In this way, the errors occurring during the initiation of the target container can be fixed in a hierarchical manner, improving the success rate of the initiation.

Figure 6:
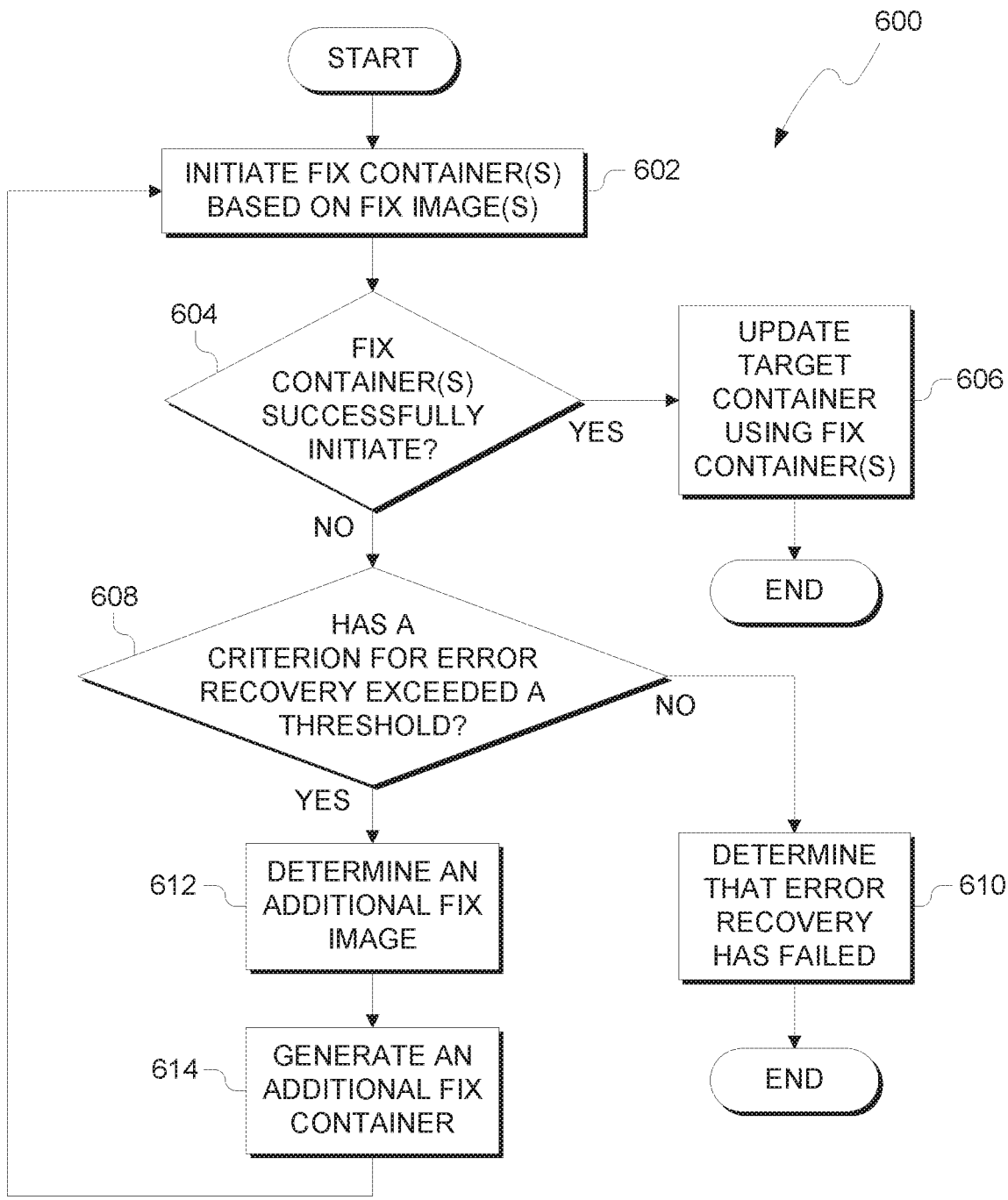
FIG. 6 depicts a flowchart of another example of a method for recovering a container according to an embodiment of the present invention.

A detailed example method for performing the error recovery is described with reference to FIG. 6, which shows a schematic diagram of an example of a method 600 for recovering a container according to an embodiment of the present invention. At process 602, the container manager 96 initiates a fix container based on the selected fix image. For example, the fix container 550 can be initiated based on the fix image 322a associated with the error 312a, and the fix container 560 can be initiated based on the fix image 322b associated with the error 312b. In this case, the target container 311 and the fix containers 550 and 560 form a container hierarchy, in which the fix containers 550 and 560 are the children of the target container 311.

At process 604, the container manager 96 determines whether the fix container is successfully initiated. If the fix container is successfully initiated, at process 606, the container manager 96 updates the part of the target container 311 using the fix container, to recover the target container 311 from the error 312. For example, in scenarios where the fix container 550 is successfully initiated, the container manager 96 uses the fix image 322*a* to fix the syntax error 312*a*, such that the target container 311 can be recovered from the syntax error 312*a*.

Otherwise, if a further error occurs during the initiation of the fix container, the container manager 96 determines a further fix image associated with the further error. The further fix image comprises information for updating a part of the fix container to remove the further error. For example, an error 562, such as a common error, occurs during the initiation of the fix container 560. In this case, the container manager 96 determines the fix image 322*n* for the common error to recover the fix container 560 from the common error 562, such that the target container 311 can be recovered with the successfully initiated fix container 560.

In some embodiments, the container manager 96 provides a control mechanism to restrict the error recovery process, such that the error recovery process cannot excessively consume resources and can be ceased or terminated after a predetermined period of time. In this case, at process 608, the container manager 96 determines whether a criterion for performing the error recovery is satisfied. For example, the criterion may be a level of the fix container in the container hierarchy being below a level threshold, a duration of the error recovery being below a duration threshold, or a total number of fix containers initiated for the error recovery exceeding a count threshold. It is understood that such control mechanism can also be applicable in the determination of the fix images 322*a* and 322*b*.

If the criterion is satisfied, at process 612, the container manager 96 determines the further fix image, for example, the fix image 322*n* for the common error. In this case, at process 614, the container manager 96 performs the error recovery of the target container 311 with the fix container 560 and the fix image 322*n*. Specifically, the container manager 96 initiates a further fix container 570 based on the fix image 322*n*, to recover its parent fix container 560 from the common error 562, and the recovered fix container 560 can in turn be used to recover the target container 311 from the configuration error 312*b*. Again, if another error occurs during the initiation of the further fix container, the container manager 96 determines another fix image for the other error and initiates another fix container based on the other fix image, until the other fix container can be successfully initiated to recover its parent container or a criterion for ceasing the process is met. In this way, the errors occurring during the initiation of the target container can be fixed in a hierarchical manner, improving the success rate of the initiation.

Otherwise, if the criterion fails to be satisfied, at process 610, the container manager 96 determines that the error recovery fails. In this case, for example, the container manager 96 ceases the error recovery process, to save cost and time.

Further, in some embodiments, if a fix container fails to fix its corresponding error 312, the container manager 96 provides information about this failure to a parent container of the failed fix container. For example, if the fix container 570 cannot fix the common error 562, its parent fix container 560 can be notified of this failure. In addition, if the fix container 550 cannot fix the syntax error 312*a*, its parent target container 311 can be notified of this failure. In this way, the failure occurring during the error recovery can be automatically notified to a higher-level container. In addition, in some embodiments, the container manager 96 automatically terminates the failed fix container, thereby improving the efficiency of the error recovery process, and reducing the resource required.

Moreover, in some embodiments, if the error recovery process succeeds, information about the errors 312 occurring in this process can be recorded for the user to review, such that the user can be aware what errors have occurred and their solutions. Alternatively or in addition, if the error recovery process fails, information about the errors 312 can also be recorded for manual recovery. In either case, information about the errors 312 is available to the user, thus improving the user experience.

Figure 7:
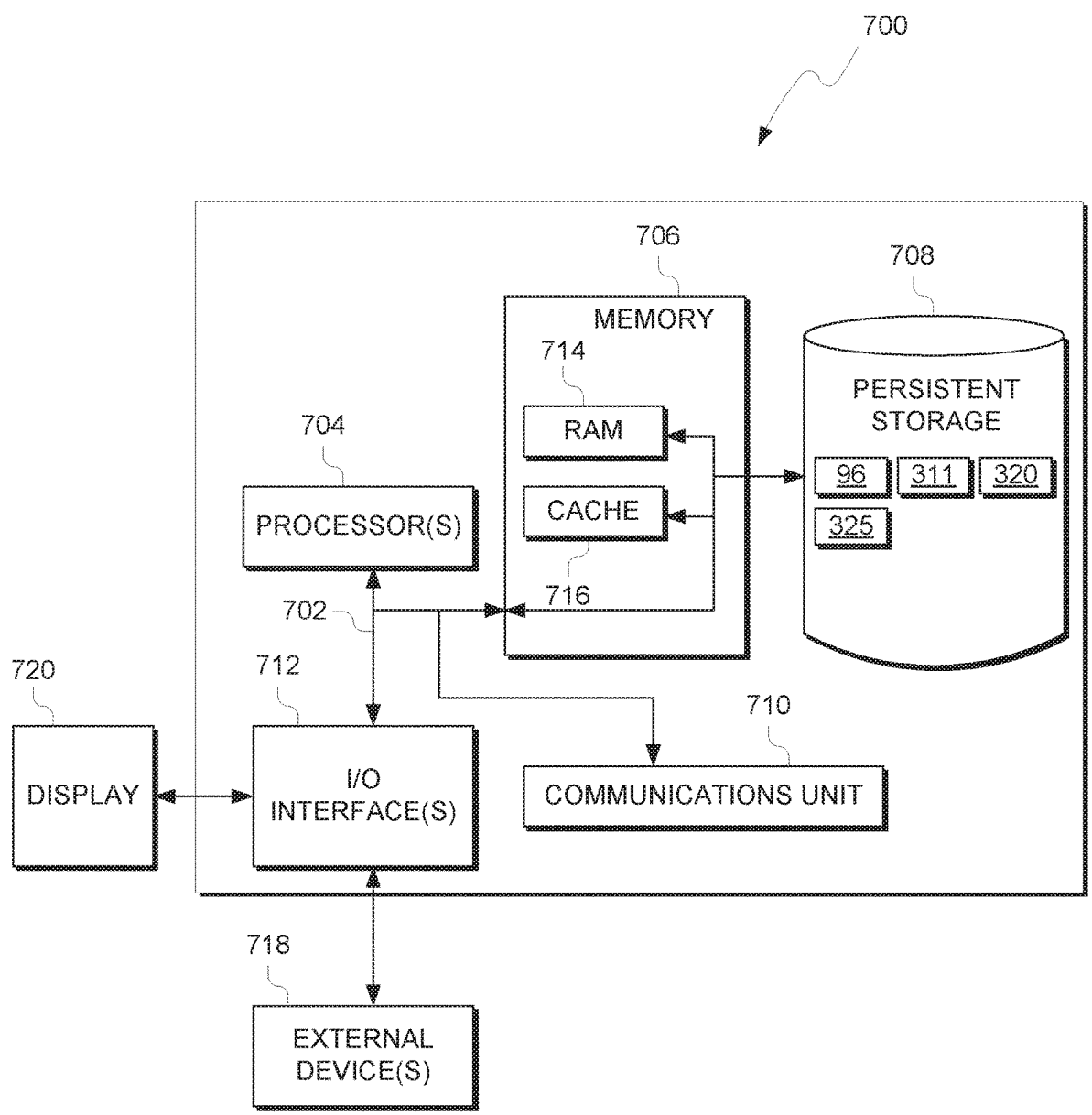
FIG. 7 depicts a cloud computing node according to an embodiment of the present invention.

It should be noted that the processing of container recovering according to embodiments of the present invention could be implemented by computer device 700 of FIG. 7.

FIG. 7 depicts a block diagram of components of computing device 700, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Container manager 96, target container 311, main storage 325 and fix image storage 320 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of cloud computing environment 50. In these examples, communications unit 710 includes one or more network interface cards. Communications unit 710 may provide communications through the use of either or both physical and wireless communications links. Container manager 96, target container, main storage 325 and fix image storage 320 may be downloaded to persistent storage 708 through communications unit 710.

I/O interface(s) 712 allows for input and output of data with other devices that may be connected to computing device 700. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., container manager 96, target container, main storage 325 and fix image storage 320, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
    initiating, by one or more processors, a run of a target container in a distributed computing environment;
    detecting, by the one or more processors, at least one error occurring during the initiation of the target container;
    determining, by the one or more processors, at least one fix image based, at least in part, on the at least one error;
    performing, by the one or more processors, an error recovery of the target container based on the at least one fix image, wherein performing the error recovery of the target container further comprises:
        initiating, by the one or more processors, a fix container based on the fix image, wherein the fix container creates a child container to the target container in a container hierarchy; and
        in response to a determination that the fix container corrects the at least one error occurring during the initiation of the target container, updating, by the one or more processors, at least part of the target container using the fix container; and
    running, by the one or more processors, in response to successfully performing the error recovery of the target container, the target container in the distributed computing environment.

2. The method of claim 1, wherein performing the error recovery of the target container further comprises:
    initiating, by the one or more processors, a fix container based on the fix image, wherein the fix container creates a child container to the target container in a container hierarchy;
    in response to a determination that a second error occurs during the initiation of the fix container, determining, by the one or more processors, a second fix image based, at least in part, on the second error; and
    performing, by the one or more processors, the error recovery of the target container with the fix container and the second fix image.

3. The method of claim 2, wherein determining the second fix image further comprises:
    determining, by the one or more processors, an error recovery criterion for performing the error recovery based on at least one or more of the following: a level of the fix container in the container hierarchy, a duration of the error recovery and a number of fix containers initiated for the error recovery.

4. The method of claim 3, the method further comprising:
    in response to the error recovery criterion for performing the error recovery exceeding a threshold, sending, by the one or more processors, an error message to the target container.

5. The method of claim 1, wherein determining the at least one fix image further comprises:
    determining, by the one or more processors, an association between the at least one fix image and the at least one error; and
    selecting, by the one or more processors, the at least one fix image based on the association.

6. The method of claim 5, wherein the at least one fix image comprises at least one fix selected from a group consisting of: a fix for a syntax error, a fix for an environment configuration error, and a fix for a dynamic error.

7. A computer program product comprising:
    one or more computer-readable storage media and program instructions stored on the one or more computer-readable storage media, the program instructions comprising:
        program instructions to initiate a run of a target container in a distributed computing environment;
        program instructions to detect at least one error occurring during the initiation of the target container;
        program instructions to determine at least one fix image based, at least in part, on the at least one error;
        program instructions to perform an error recovery of the target container based on the at least one fix image, wherein program instructions to perform the error recovery of the target container further comprises:
            program instructions to initiate a fix container based on the fix image, wherein the fix container creates a child container to the target container in a container hierarchy; and
            in response to a determination that the fix container corrects the at least one error occurring during the initiation of the target container, program instructions to update at least part of the target container using the fix container; and
        program instructions to run, in response to successfully performing the error recovery of the target container, the target container in the distributed computing environment.

8. The computer program product of claim 7, wherein program instructions to perform the error recovery of the target container further comprises:
    program instructions to initiate a fix container based on the fix image, wherein the fix container creates a child container to the target container in a container hierarchy;
    in response to a determination that a second error occurs during the initiation of the fix container, program instructions to determine a second fix image based, at least in part, on the second error; and
    program instructions to perform the error recovery of the target container with the fix container and the second fix image.

9. The computer program product of claim 8, wherein program instructions to determine the second fix image further comprises:
   program instructions to determine an error recovery criterion for performing the error recovery based on at least one or more of the following: a level of the fix container in the container hierarchy, a duration of the error recovery and a number of fix containers initiated for the error recovery.

10. The computer program product of claim 9, the program instructions further comprising:
   in response to the error recovery criterion for performing the error recovery exceeding a threshold, program instructions to send an error message to the target container.

11. The computer program product of claim 7, wherein program instructions to determine the at least one fix image further comprises:
   program instructions to determine an association between the at least one fix image and the at least one error; and
   program instructions to select the at least one fix image based on the association.

12. The computer program product of claim 11, wherein the at least one fix image comprises at least one fix selected from a group consisting of: a fix for a syntax error, a fix for an environment configuration error, and a fix for a dynamic error.

13. A computer system comprising:
   one or more computer processors;
   one or more computer readable storage media; and
   program instructions stored on the computer readable storage media for execution by at least one of the one or more processors, the program instructions comprising:
      program instructions to initiate a run of a target container in a distributed computing environment;
      program instructions to detect at least one error occurring during the initiation of the target container;
      program instructions to determine at least one fix image based, at least in part, on the at least one error;
      program instructions to perform an error recovery of the target container based on the at least one fix image, wherein program instructions to perform the error recovery of the target container further comprises:
         program instructions to initiate a fix container based on the fix image, wherein the fix container creates a child container to the target container in a container hierarchy; and
         in response to a determination that the fix container corrects the at least one error occurring during the initiation of the target container, program instructions to update at least part of the target container using the fix container; and
      program instructions to run, in response to successfully performing the error recovery of the target container, the target container in the distributed computing environment.

14. The computer system of claim 13, wherein program instructions to perform the error recovery of the target container further comprises:
   program instructions to initiate a fix container based on the fix image, wherein the fix container creates a child container to the target container in a container hierarchy;
   in response to a determination that a second error occurs during the initiation of the fix container, program instructions to determine a second fix image based, at least in part, on the second error; and
   program instructions to perform the error recovery of the target container with the fix container and the second fix image.

15. The computer system of claim 14, wherein program instructions to determine the second fix image further comprises:
   program instructions to determine an error recovery criterion for performing the error recovery based on at least one or more of the following: a level of the fix container in the container hierarchy, a duration of the error recovery and a number of fix containers initiated for the error recovery.

16. The computer system of claim 15, the program instructions further comprising:
   in response to the error recovery criterion for performing the error recovery exceeding a threshold, program instructions to send an error message to the target container.

17. The computer system of claim 13, wherein program instructions to determine the at least one fix image further comprises:
   program instructions to determine an association between the at least one fix image and the at least one error; and
   program instructions to select the at least one fix image based on the association.

* * * * *